Figure 1:
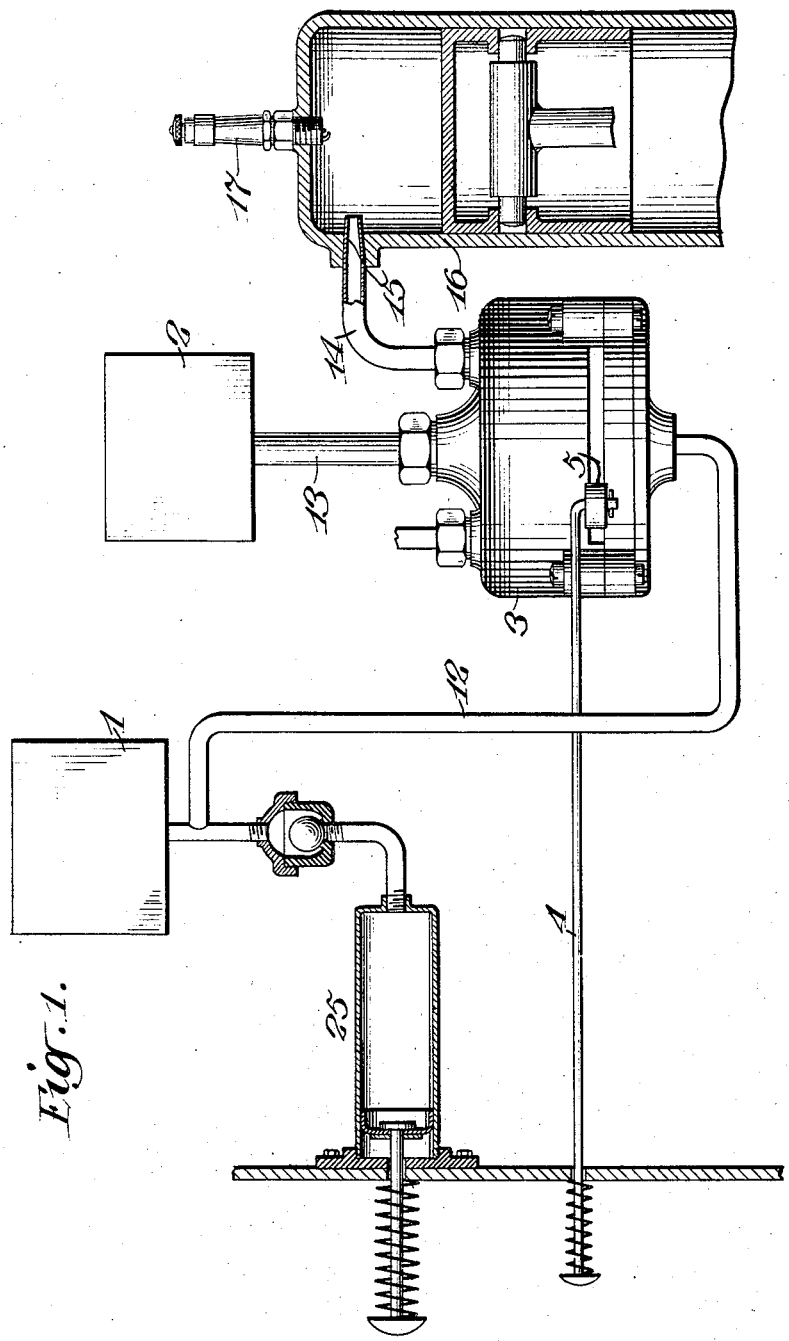

M. P. RYDER.
STARTING DEVICE FOR INTERNAL COMBUSTION ENGINES.
APPLICATION FILED FEB. 14, 1912.

1,087,465.

Patented Feb. 17, 1914.

2 SHEETS—SHEET 1.

WITNESSES
M. A. Porter.
F. B. Townsend.

INVENTOR
Malcolm P. Ryder.
BY
Townsend & Decker
ATTORNEYS

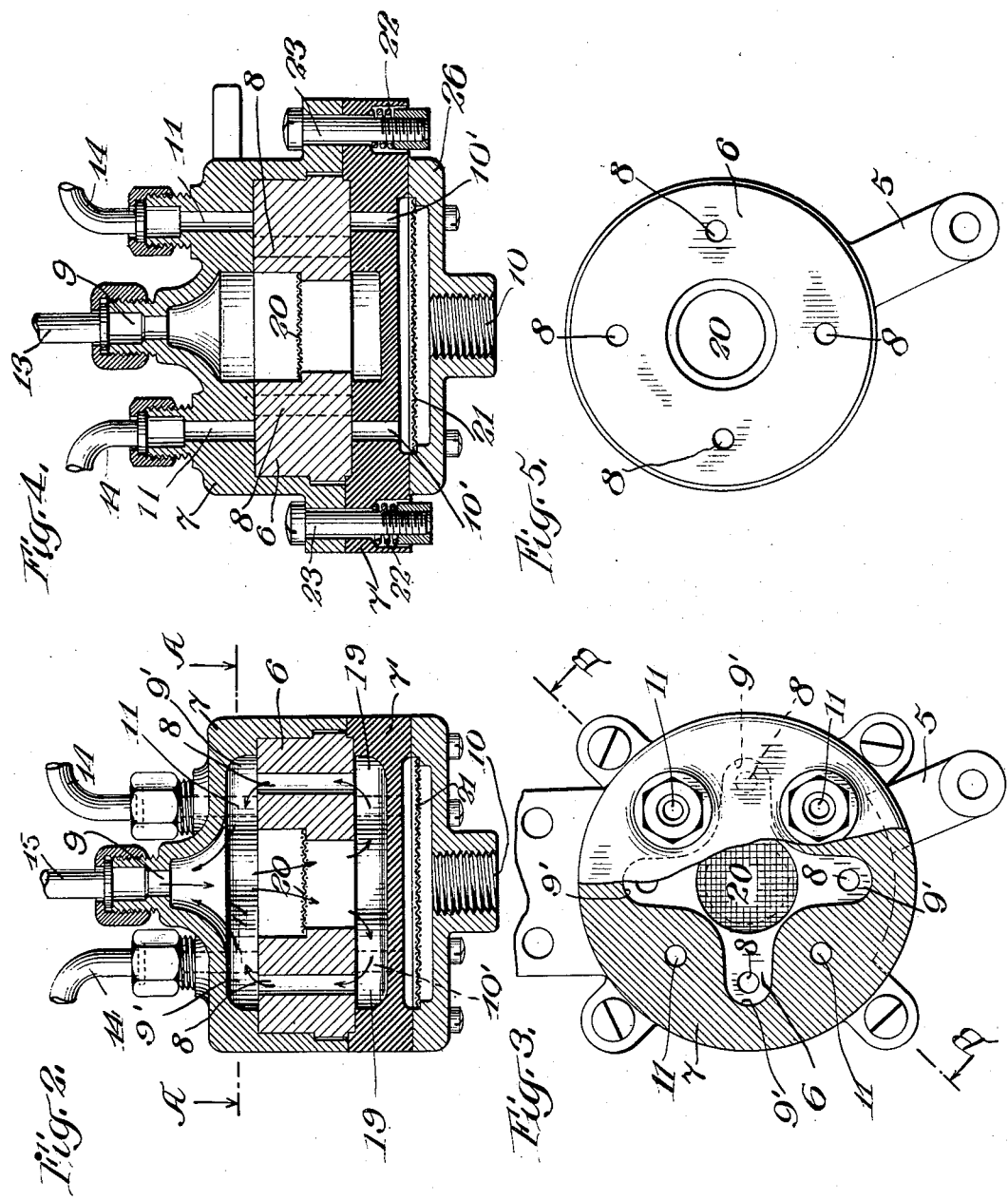

UNITED STATES PATENT OFFICE.

MALCOLM P. RYDER, OF SPRINGFIELD, MASSACHUSETTS.

STARTING DEVICE FOR INTERNAL-COMBUSTION ENGINES.

1,087,465. Specification of Letters Patent. Patented Feb. 17, 1914.

Application filed February 14, 1912. Serial No. 677,506.

*To all whom it may concern:*

Be it known that I, MALCOLM P. RYDER, a citizen of the United States, and a resident of Springfield, in the State of Massachusetts, have invented certain new and useful Improvements in Starting Devices for Internal-Combustion Engines, of which the following is a specification.

My invention relates to means for priming the cylinder or cylinders of an internal combustion engine, so as to facilitate starting the engine by cranking, or obviate cranking entirely by exploding the charge in cylinders by switching on the spark.
The object of my invention is to provide a simple and reliable means whereby a charge of gasolene, or similar combustible fluid, may be measured off and then blown into the cylinder or cylinders of the engine by air under pressure.

A further object is to provide means whereby a separate charge may be measured off for each of the cylinders of a multi-cylinder internal combustion engine, and each charge may be delivered to its own cylinder by practically one operation.

A further object of my invention is to avoid the difficulties incident to the entrapping of air in the measuring passage or space of the measuring device which, when retained therein, prevents the proper measuring of the charge of priming fluid.

A further object of my invention is to prevent leakage of the measuring device, especially when employed for measuring and delivering separate charges for the different cylinders of a multi-cylinder engine.

To these ends my invention consists in the combinations of apparatus and details of construction hereinafter more particularly described and then specified in the claims.

In the following description gasolene is set forth as the priming fluid, but any other suitable fluid or gas may be used with the same apparatus.

In the accompanying drawings I have shown the device with one of the cylinders of a multi-cylinder engine connected thereto and with suitable connections from the measuring device for supplying in all four cylinders of a multi-cylinder engine.

As will be apparent from the sub-joined description, the measuring device, by a simple multiplication of measuring passages, ports and connections, might be used to supply any number of cylinders simultaneously, each with its own priming charge, or might equally well be employed for supplying a less number by diminishing the number of ports and passages or by permanently closing some of the inlet and outlet connections on the valve casing or shell of the apparatus shown.

In the drawings, Figure 1 is a general side elevation of an apparatus constructed in accordance with my invention, the parts being shown in vertical section. Fig. 2 is a vertical section through the measuring valve on the line of the measuring passages therein. Fig. 3 is a plan view and partial horizontal section on the line A A, Fig. 2. Fig. 4 is a vertical cross-section on the line B B, Fig. 3. Fig. 5 is a plan view of the disk portion of the valve showing the measuring passages therein.

2 indicates a tank containing gasolene or other suitable priming fluid and properly located as convenience and conditions of use may dictate.

3 in Fig. 1 indicates the measuring valve properly connected by pipe 13 with the tank 2 whereby the fluid for the measured charges may be supplied through the intake 9, Figs. 2 and 4, to the valve for each operation thereof.

1 indicates a tank or cylinder adapted to contain and store air under pressure and connected by pipe 12 to a suitable inlet or intake 10 for the valve. The tank 1 provides a source of air retained under pressure and ready to blow the charge measured off by the valve into the cylinder or cylinders of the engine upon the operation of the valve to measure the charge, and the movement of the latter with its measured charge into position where each measuring passage will register with the port or ports supplied from the tank 1.

5 is the operating lever for the valve connected by the rod 4 with a push knob or with other operating means, whereby the valve may be turned to receive the measured charge from the tank and then into position for admitting air from tank 1 to blow out the measured charge from the measuring passage into the pipe 14 connected preferably through a spraying jet 15 with the engine cylinder. A spring as indicated may be employed under the head of the operating rod 4 to hold the valve in one or the other of its positions. Preferably said valve stands normally in position to measure the charge. The operation of the push knob and the operating lever to which it is connected would then turn the valve from the position in which it receives the measured charge or charges from the gasolene tank into position for allowing the air from the storage tank to force the gasolene into the engine cylinder or cylinders and the spring would serve then to return the valve to position for receiving the measured charge.

Air under pressure may be provided in the tank 1 by any means ready for the operation of blowing out the measured charge on movement of the valve to the proper position, but ordinarily, I prefer to employ an air pump indicated at 25 and connected through a check valve with the tank in the manner shown or in any other suitable manner.

The measuring device or valve is preferably of the disk type.

6 indicates the disk which works between two finished surfaces in the two parts 7, 7' of the casing, said parts being preferably secured together by devices which will hold the disk by spring pressure against said surfaces which latter contain the inlet and outlet ports with which the measuring passages in the disk may be brought into registry in the operations of measuring the fluid and blowing the same into the connecting pipe or pipes 14 leading to the engine cylinders. In the construction shown, the parts 7 and 7' are secured together by bolts 23 having springs 22 applied thereto and pressing against the part 7' which thereby acts as a follower plate upon the disk 6 loosely fitted in a recess in the part 7. Through the disks 6 are drilled measuring cavities or passages 8, as many in number as the cylinders to be simultaneously supplied, and in each cavity or passage the priming fluid is measured. Four such passages are shown thereby adapting the device to supply four cylinders through the appropriate connecting device 14. On the inside face of part 7, against which the disk works, are formed ports 9' corresponding in number to passages 8 and communicating with a space or chamber in the case 7 to which the intake 9 is connected. In the part 7 are also provided four outlet ports 11 reaching from the face against which the disk works to outlets to which the connecting pipes 14 are coupled. The outlet ports 11 correspond in number to the measuring passages 8 and are arranged preferably in alternation with the inlet ports 9' for the gasolene.

In the face of the follower plate or portion 7' of the valve casing against which the disk works, ports 19 are provided similar to the ports 9' and communicating in the face of said disk with a space opposite the lower end of an enlarged passage 20 extending through the disk and communicating at its upper end with the space into which the gasolene is delivered from the intake 9. A screen may be employed in this passage as indicated to intercept foreign substances in the gasolene. The plate or portion 7' is also provided with air ports or passages 10' extending through the same. The measuring passages 8 with their charges of fluid are adapted to register with the ports 10' when the disk is turned to position in which the said passages register with the outlet ports 11. The ports or passages 10' communicate freely with the chamber in the head 26 carrying the air intake 10, which head is bolted to the exterior of the plate 7' and carries, by preference, a screen 21 for intercepting impurities in the air supply. The spring pressed follower plate presses the disk firmly against the finished surfaces in the casing on which the ports are formed for the ingress and escape of gasolene and this makes a tight joint or fit so that the valve is free from the danger of leakage of gasolene.

By means of the central passage 20 and the ports 19 the measuring passages or spaces are placed at both ends in direct connection with the gasolene supply so that any air entrapped in said passages will be readily displaced by the gasolene.

The arrows Fig. 2 show the manner in which the gasolene flows downward through the screen and passage in the center of the valve and upward through the measuring passages 8, displacing air in the latter so that the air may escape through the gasolene supply into the gasolene tank. This is the position of the disk valve while receiving its charge of gasolene. The movement of the disk to bring the passages 8 into registry with the ports 10' and 11 cuts off that connection with the gasolene supply in an obvious manner.

The operation of the apparatus would be as follows assuming that the air tank 1 does not contain air under pressure at the time it is desired to make use of the apparatus for priming the cylinder or cylinders; and that the disk valve normally stands in position to receive gasolene from inlet 9 in its measuring passages or spaces 8 which, under this supposition, register normally with the inlet ports 9' at the top of the disk and 19 at the bottom. The air pump will be first operated one or more times as may be required, and the air from the same will pass by the check valve into the air storage tank. After sufficient pressure is stored in the tank, the operating knob connected to lever 5 may be pressed, thereby turning the valve and bringing passages 8 with their measured charges of gasolene into registry with the air inlet ports 10' and the mixture exit ports or passages 11. Immediately upon the disk assuming the latter position, the air from the storage tank will blow the charges in the passages 8 into the engine cylinders thereby priming the same and each cylinder will receive its appointed or desired amount of priming fluid or mixture. On release of the knob, the valve returns to position for receiving another charge of liquid and, if desired, the operation may be repeated a second time or as many times as found necessary.

It will, of course, be possible in the operation of this device to move the valve with its measuring passages into registry with the air inlet and mixture outlet ports and then operate the pump, but for large engines with a considerable number of cylinders, it is preferable to make use of the tank in which a sufficient supply of air for a large number of cylinders may be stored ready for the priming operation, by operating the hand pump or by other means, it being impractical to operate by hand or foot a pump large enough to supply at one stroke the necessary amount of air.

It is found in practice that in charging or priming a number of cylinders at the same time by my apparatus the device operates efficiently, although as in the case, for instance, of a four cylinder engine it might seem that the charge sent into the two cylinders, each of which has one valve open, would be wasted. Experience proves, however, that this is not the case, as enough charges stay in these two cylinders to help out the rather weak charge taken from the carbureter during the first cycle.

The dimensions of passage 8 should be such as to hold the mimimum quantity of gasolene required to properly prime the cylinder when same is hot and already contains a mixture that is somewhere near of explosive proportions, the priming then supplying the deficiency of inflammable material. When the same apparatus is used to start the engine cold, a greater amount of inflammable material may be supplied by operating the device several times if necessary.

Among the advantages of this device are the following. It supplies a definite amount of priming fluid to each cylinder, which amount may be varied by operating it a number of times as described above. The priming fluid is injected into the cylinder under considerable pressure and under the best conditions for rapidly forming a homogeneous mixture with the contents of the cylinder. It is very simple to operate, and, if used with a suitable priming fluid, cannot cause conditions that would be likely to injure the engine. It contains no check valves or other delicate parts that are likely to become clogged or get out of order. Its construction is such that the valve portion can be easily made tight against leakage and is likely to remain tight in service. When applied to a gasolene engine it may be operated with the same fuel and from the same tank as is used to supply an engine. It is practically fool proof and needs no care or attention to keep it in working order.

I am aware that it has been before proposed to prime the cylinders of a multi-cylinder engine from the same priming device, the latter being organized to measure only one charge which is delivered from the measuring space by air pressure, the mixture being afterward distributed between the various cylinders. In my invention it will be seen, however, that a separate and definite charge is measured off for each cylinder.

What I claim as my invention is:

1. In a priming apparatus for internal combustion engines, the combination of a source of compressed air, a source of priming fluid and a measuring valve having inlet ports connected respectively to the source of priming fluid and to the source of air or gas under pressure and outlet ports connected respectively to the cylinders of the engine, and measuring chambers or passages in said valve adapted to connect in one position with the inlet port connected with the priming fluid and in the other position to connect with the source of air and to register respectively with the outlet ports leading to the respective cylinders of the engine.

2. In a priming device for multiple cylinder internal combustion engines, the combination of a valve having fluid measuring passages one for each cylinder, an inlet port for permitting the valve in one position to receive a charge of fluid in each of said passages, outlet ports one for each passage for discharging the fluid therefrom in another position of the valve, connections from said ports respectively to the cylinders of the engine, and means for turning said valve at will to deliver the charges of priming fluid to the engine cylinders simultaneously.

3. In a priming apparatus for internal combustion engines, the combination of a source of air or gas under pressure, a source of priming fluid and a fluid measuring valve having a measuring passage adapted to receive a determinate quantity of priming fluid, and ports and connections for connecting said passage at both ends to the gasolene supply in one position of the device and in the other position connecting it between the engine cylinder and the source of air or gas under pressure.

4. In a priming apparatus for multiple cylinder internal combustion engines, the combination of a fluid measuring valve having a series of fluid measuring passages one for each cylinder of the engine, a source of priming fluid, a source of compressed air and ports and connections for connecting the measuring passages to the source of priming fluid in one position of the valve and in another position placing them with their measured charges simultaneously in the connections respectively between the source of air or gas and the engine cylinders.

5. In a priming device for internal combustion engines, the combination of a source of priming fluid, a source of compressed air and a valve having as many measuring passages as there are cylinders to the engine with pipes and connections whereby the separate charges of priming fluid in said passages may be blown into the engine cylinders respectively by air pressure applied simultaneously to said charges.

6. In a priming device for internal combustion engines, the combination with a source of priming fluid, of a disk valve having multiple measuring passages extending through the disk, ports whereby the said passages are connected at both ends to the gasolene supply for measuring the fluid and independent ports on opposite sides of the disk having connections on the one side for the separate cylinders of the engine respectively and on the other for a source of compressed air.

7. In a priming device for internal combustion engines the combination of a source of air under pressure and a source of priming fluid, a disk valve having measuring passages extending from face to face thereof, a two-part case between the faces of which said disk works, one part having in its face ports for supplying the priming fluid to the passages and for allowing the discharge from said passages separately and the other part having ports for the inlet of air to said passages when in discharge position.

8. In a priming apparatus for internal combustion engines, a source of air or gas under pressure and a source of priming fluid combined with a measuring valve provided with a measuring passage and ports for connecting said passage at both ends with the fluid supply to receive the measured charge.

9. In a priming device for internal combustion engines, the combination with sources of air and fluid supply, of a disk valve having fluid measuring passages and means for holding it by spring pressure against finished surfaces containing the intake and outlet ports with which said passages register in alternation to receive the charge of fluid and to discharge the same under air pressure.

Signed at Springfield in the county of Hampden and State of Mass. this 10 day of February A. D. 1912.

MALCOLM P. RYDER.

Witnesses:
C. STEINMETZ,
L. E. EASTMAN.